P. G. GARDINER.
SHEARING AND CUTTING STEEL PLATES IN CONNECTION WITH SHEARING MACHINES.
No. 16,794. Patented Mar. 10, 1857.
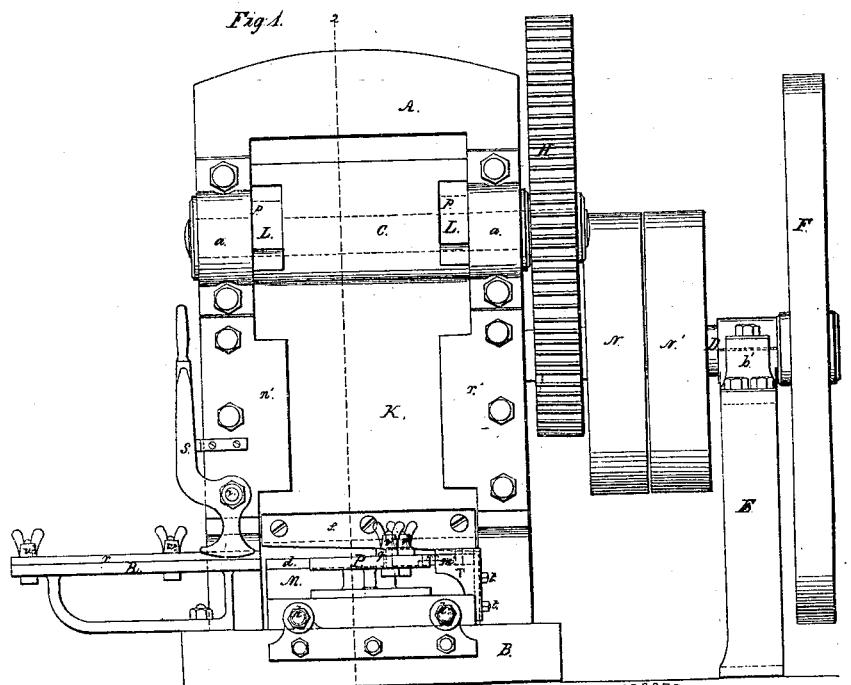
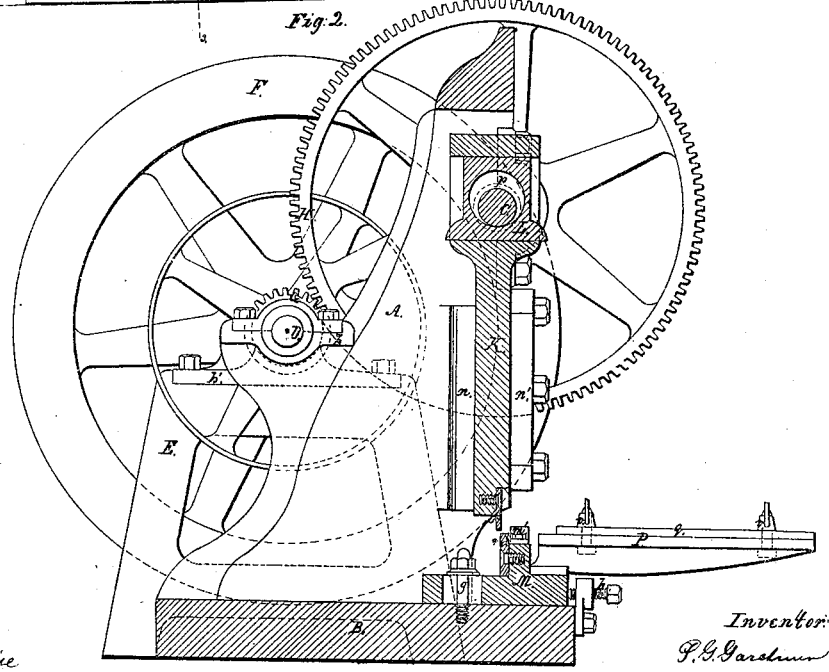

UNITED STATES PATENT OFFICE.

PERRY G. GARDINER, OF NEW YORK, N. Y.

MACHINE FOR SHEARING STEEL PLATES.

Specification of Letters Patent No. 16,794, dated March 10, 1857.

*To all whom it may concern:*

Be it known that I, PERRY G. GARDINER, of the city, county, and State of New York, mechanical engineer, have invented a new and useful improvement in cutting or shearing steel plates to any required angle for making into coiled springs and other similar purposes and which is adapted chiefly to preparing the thin plates of steel out of which I make conical coiled steel springs for being put into and acted upon by the machinery invented by me and described in my specification for Letters Patent for coiling conical steel springs for railroad-cars and other purposes.

In the manufacture of my improved car-spring, a thin narrow steel plate is used of sufficient length to form the coil in one piece. In order to form the base and apex or upper surface of the spring, so as that when the conical coil is finished the base and top will present a flat and even surface, and these parallel to each other, it is necessary, that a piece should be cut angularly from the sides of the plate which form the lower and upper portion of the coil; the part of the plate forming the base or lower coil requiring a piece to be taken off equal in length to the length of the last or lower coil, and graduated in width exactly in proportion to the rise or pitch of the cone; and the part of the plate forming the upper or first coil must have a piece taken off in length equal to the length or circumference of this coil, and in width proportioned to its pitch or rise upon the cone. The end of the plate requires, also, to be cut true and straight, so as to fit into the slot in the mandrel at the right angle. It is for cutting these plates accurately and regulating the angle at which the pieces are to be cut off and adjusting and holding the plates securely, that my improvements are devised. The plates are cut or sheared when cold, and they must be cut with facility, and rapidly in order to afford a supply for the coiling machines. To effect this a very powerful shearing machine is required, and I proceed to describe the machine itself, in connection with my improvements and invention, although I make no claim to the shears as such, or the mechanical means by which they are put in motion.

In the accompanying drawings, Figure I represents a front view of the machine and of my improvements. Fig. II, a cross vertical section of the same through the line 2—3.

A is a strong frame secured to the bed plate B and provided with suitable bearings $a, a$, for the eccentric shaft C, to run in, and with a bearing $b$, for the end of the driving shaft D. The other end of this driving shaft is supported in the bearing $b'$ attached to the frame E. Upon this driving shaft are placed the fast and loose pulleys N, N' for communicating motion to the machine, or releasing it, and at the end of the shaft is the regulating fly wheel F. G is a pinion fast on the other end of shaft D which gears into the wheel H on the shaft C.

K is a solid plate or slide moving vertically between guides $n, n'$ which are carefully fitted to the frame A so as to allow the slide to move freely.

L, L are blocks fitted into the slide K and upon the eccentrics $p, p$ which are fast on the shaft C, and through which motion is communicated to the slide K.

M is a solid plate or bracket attached to the bed plate B by bolts $g$, passing through slotted openings in M and capable of being regulated or adjusted by means of the set screws $h, h$.

To the lower end of the shearing slide K is fixed a steel cutter $f$, which acts in connection with the corresponding lower steel cutter $d$ attached to the bracket plate M which rests upon the bed plate, but which is adjustable through the slots above mentioned so as to be brought nearer to the cutter $f$, as the cutters wear away. The cutting edges of $f$ and $d$, are set to an acute angle from end to end so that in the process of shearing the action upon the plate between them is gradual.

P is a table having a smooth flat surface and is attached to the middle of the front face of the bracket plate M; and has upon its upper surface a movable guide bar or plate $q$ which is capable of being firmly adjusted to the table in any desired position by means of the thumb screws $v, v$, working in slots in the table.

R is a table similar to that just described and is attached at one side of the machine to the bed plate B, and is likewise provided with a movable guide bar or plate $r$, capable of being adjusted and fixed at any desired position upon the surface of the table by means of the thumb screws W, W.

S is a lever working upon a center $x$ firmly fixed to the frame A above the table R. The lower end of this lever has a circular form and is flattened, and is made an eccentric, so that when the handle of the lever is pressed downward the eccentric part of the lever will catch the steel plate between it and the surface of the table R and hold the plate steady while the spears are acting upon it. M' is an adjustable stop or plate for resting the end of the steel plate against at the required point which regulates the length of the strip to be cut off; it is fixed to the bracket plate M, and is adjustable by means of a screw.

T is an upright plate having two sides forming a right angle one of which sides is fixed to the end of the bracket M by two screws $t, t$, passing through horizontal slots in the upright plate, the other of which sides fronts the shears and also $m'$; so that by moving the plate in or out upon the slots of the screw $t, t$, the distance between the screws and the face of the plate toward them, will be less or greater. When the steel plates are to be cut for coiling, and the machine operated, the stop $m$ is adjusted so as to bring the end of the steel plate when placed in the shears (when open) at the right position for the length of the strip to be cut off, and the plate T is adjusted at such a distance from the cutting edges of the shears as will regulate the width of the strip to be cut off at the beginning of the cut; and the guide bar $r$ is adjusted upon its table so that upon the steel plate being pressed against it, it will in connection with $m'$ and T bring the steel plate between the shears so as to cut the strip off at the exact width, length and angle required. The lever S is then brought quickly down upon the steel plate, and it is thus held firmly and accurately for the shears to operate upon it; and the steel plates are thus all cut accurately and rapidly without being heated. When the end of the plate is to be cut off the table P and guide bar $q$ are used.

Having thus described my improvements, what I claim as my invention therein and for which I claim Letters Patent is—

The arrangement of the movable bracket plate M so as to adjust the lower steel cutter $d$, to the upper steel cutter $f$ as required; the adjustable stop or guide plates T, $m'$, and the guide bars $q$, and $r$, upon the tables attached to M; and the eccentric lever S; the whole combined arranged and operating in connection with the shears, in the manner and for the purposes above described.

P. G. GARDINER.

Witnesses:
J. B. STAPLES,
RICHARD WINNE.